Figure 1:
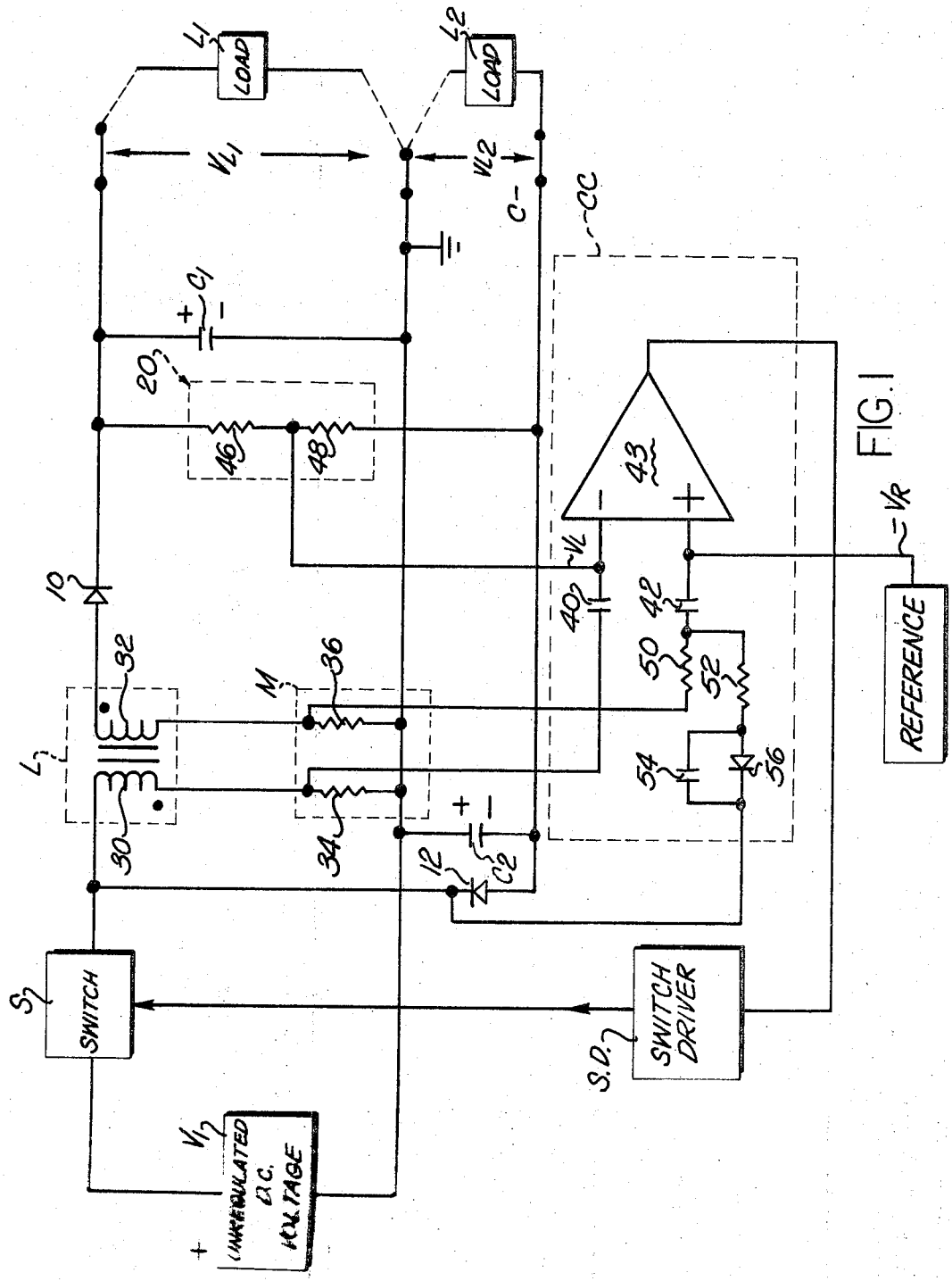

United States Patent [19]
Brokaw

[11] 3,790,878
[45] Feb. 5, 1974

[54] SWITCHING REGULATOR HAVING IMPROVED CONTROL CIRCUITING

[75] Inventor: Adrian Paul Brokaw, Woburn, Mass.

[73] Assignee: Keithley Instruments Inc., Solon, Ohio

[22] Filed: Dec. 22, 1971

[21] Appl. No.: 210,999

[52] U.S. Cl............................ 323/17, 321/2, 323/20, 323/DIG. 1
[51] Int. Cl............................................. G05f 1/20
[58] Field of Search........ 323/17, 20, DIG. 1; 321/2

[56] References Cited
UNITED STATES PATENTS

| | | | |
|---|---|---|---|
| 3,663,949 | 5/1972 | Froeschle | 323/17 |
| 3,562,623 | 2/1971 | Farnsworth | 321/2 |
| 3,564,393 | 2/1971 | Williamson | 323/DIG. 1 |
| 3,628,047 | 12/1971 | Cronin et al. | 323/DIG. 1 |
| 3,629,686 | 12/1971 | Hetterscheid et al. | 323/DIG. 1 |
| 3,675,115 | 7/1972 | O'Loughlin | 323/DIG. 1 |
| 3,461,377 | 8/1969 | Reese | 323/DIG. 1 |
| 3,523,239 | 8/1970 | Heard | 323/20 |
| 3,581,187 | 5/1971 | Grady, Jr. | 323/17 |

FOREIGN PATENTS OR APPLICATIONS

| | | | |
|---|---|---|---|
| 1,142,576 | 2/1969 | Great Britain | 323/DIG. 1 |

Primary Examiner—Gerald Goldberg

[57] ABSTRACT

An electrical circuit particularly applicable for use as a switching regulator having a storage inductor which periodically receives energy from a D.C. voltage source through a switch. Energy is released from the inductor when the switch is off to supply a load circuit. The ratio of switch on time to switch off time is controlled in dependence upon changes in the amount of supplied energizing current and the released inductor current.

29 Claims, 2 Drawing Figures

SWITCHING REGULATOR HAVING IMPROVED CONTROL CIRCUITING

This invention is particularly applicable for use as a switching regulator for regulating an output voltage to be applied to a load, and will be described with particular reference thereto although it may be applied to other electrical circuits.

Switching regulators generally include a switching transistor for periodically transferring energy from a D.C. voltage source to a storage means, such as an inductor, to which an energy receiving load is connected. Regulation of the output voltage is normally obtained by varying the switch on time to vary the amount of energy transferred to the load in dependence upon the load requirements.

The present invention provides that the output voltage regulation be additionally attained by directly sensing the amount of energy applied to the storage means, and the amount of energy released therefrom.

Consequently, an object of the present invention is to control the on-off ratio of the switching means employed in a voltage regulator in dependence upon the amount of energy transferred to the storage means and the amount of energy released therefrom.

It is a still further object of the present invention to additionally vary the ratio of switch on time to switch off time in dependence upon the load requirements so as to thereby vary the net energy transfer to maintain a regulated output voltage.

A still further object of the present invention is to provide an improved switching regulator wherein energy is transferred to the load only when the switching means is open, whereupon the output voltage may be regulated to a value greater than that of the input voltage with the regulation being attained by controlling the switching means in dependence upon the amount of energy supplied to the storage means and the amount of energy released therefrom.

It is a still further object of the present invention to provide a current limited switching regulator for limiting the magnitude of the current flowing through the switching means during the period that the output voltage is building up toward its regulated value, and then employing voltage regulation for regulating the output voltage during normal operation.

It is a still further object of the present invention to provide a switching regulator having a multiple output, multiple flyback circuit arrangement for providing regulated output voltages for a plurality of loads.

To attain these objectives, the present invention employs circuitry for delivering energy from a source to a load and comprises energy storage means, such as an inductor, and switch means for connecting the storage means to the source so as to supply energizing current thereto. Circuitry is employed for connecting the storage means to the load to supply current to the load from the energy stored in the storage means when the switch means is in an open circuit condition. Means are also provided to operate the switch means between an open circuit condition and a closed circuit condition, and including circuitry which responds to the rate of change of the energizing current for actuating the switching means to its closed circuit condition.

In accordance with another aspect of the present invention, the load circuit includes both diode means and capacitor means connected in series and arranged so that inductive current flows from the storage means to charge the capacitive means as energy is released when the switching means is off. Also, in this aspect of the invention, a switch control is provided for controlling the ratio of switch on time to switch off time by monitoring the energizing current during the switch on time and the current released during the switch off time. Based on such monitoring the switching means is controlled so that the ratio of on time to off time varies in dependence upon the amount of increasee in the energizing current and the amount of decrease in the released current.

Still further in accordance with the present invention, the ratio of the on to off time is additionally varied in accordance with the load voltage across the capacitive means so as to thereby vary the net change in the energy being stored and released in accordance with variations in the voltage across the capacitive means and the load circuit.

In accordance with a still further aspect of the present invention, the storage means includes an inductor-transformer having a primary winding and a secondary winding, with the current sensing means taking the form of impedances respectively connected in series with the primary winding and the secondary winding so that voltages are developed across the impedances in dependence upon the magnitude of current flowing through the primary winding and the secondary winding. These voltages are then applied to control circuitry for controlling the ratio of switch on time to switch off time to maintain a regulated output voltage.

Figure 2:
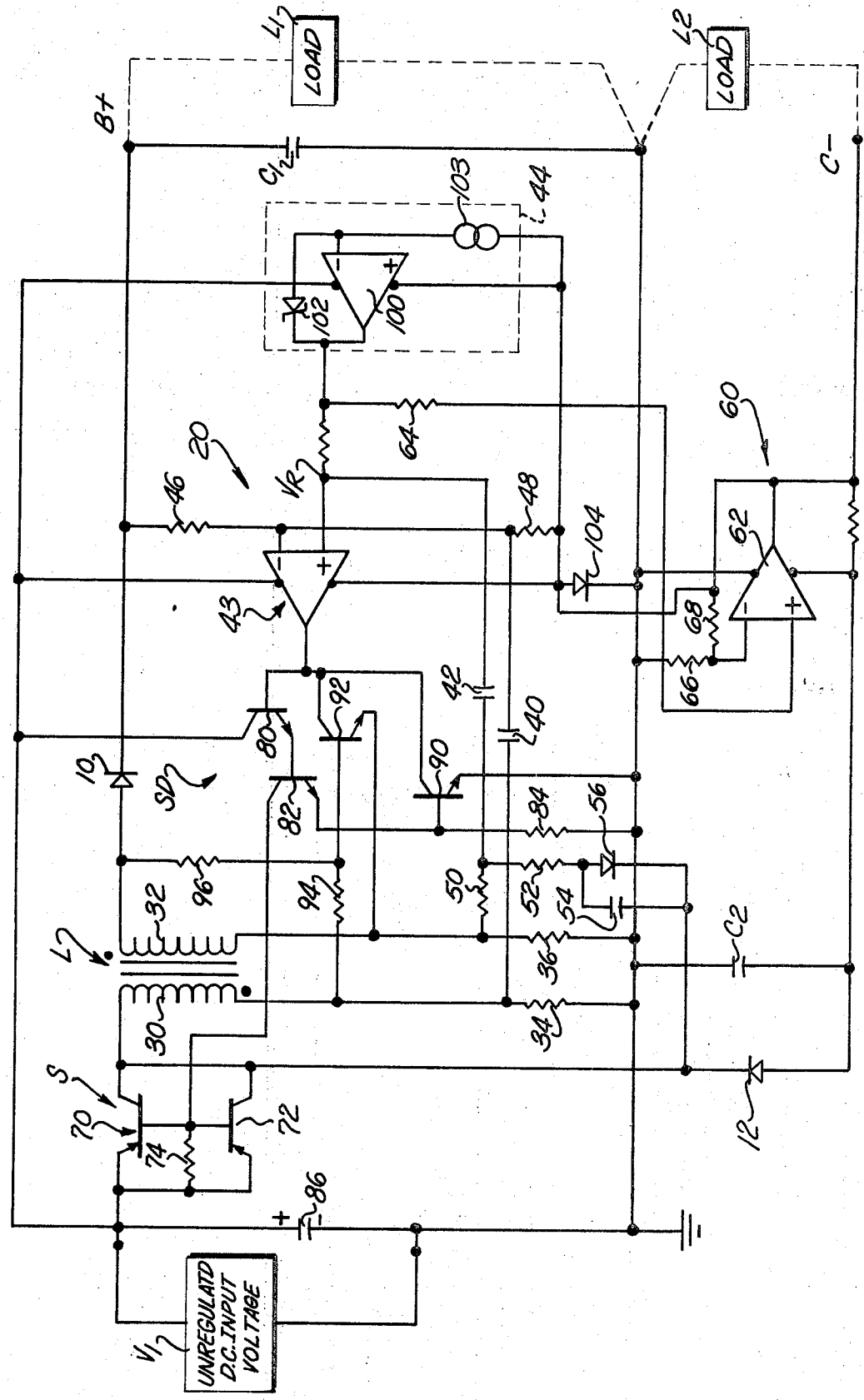

The foregoing and other objects and advantages of the invention will become more readily apparent from the following description of the preferred embodiment of the invention when taken in conjunction with the accompanying drawings which are a aprt hereof and wherein:

FIG. 1 is a simplified schematic-block diagram illustration of one embodiment of the invention; and, FIG. 2 is a more detailed schematic illustration of the invention.

Referring now to the drawings wherein the showings are for purposes of illustrating a preferred embodiment of the invention only and not for purposes of limiting same, FIG. 1 illustrates a simplified version of one embodiment of the invention, and to which the description herein will initially be directed followed by a more detailed description with respect to the schematic illustration of the invention shown in FIG. 2. The switching regulator as shown in FIG. 1, serves to provide regulated B+ and C− voltages for respective loads $L_1$ and $L_2$ from an unregulated D.C. voltage source $V_1$ whose output voltage may vary over a range from a value less than to a value greater than the regulated B+ and C− voltages. For example, where the B+ and C− voltages are to be regulated at +5.0 volts and −12.5 volts, regulation to these voltages is attained by the switching regulator even though the value of the unregulated D.C. voltage $V_1$ may vary over a range from approximately 4 volts to 15 volts. The unregulated D.C. voltage source $V_1$ may be obtained by rectification of an A.C. source, or may be obtained from a battery source.

The switching regulator employs an energy storage inductor L which serves to receive and store up energy as transient current buildup is obtained from the voltage source $V_1$ during the period that a switch S is on. When switch S is off, energy is released from inductor L to provide charging current for capacitors $C_1$ and $C_2$.

These capacitors are connected across the load terminals to provide the regulated output voltages for loads $L_1$ and $L_2$, respectively. Diodes 10 and 12 are connected in the series charging circuits of capacitors $C_1$ and $C_2$ to prevent energy transfer to the capacitors except when switch S is off.

Switch S is alternately turned on and off under the control of a switch driver SD in response to turn on and turn off signals provided by a control circuit CC. The control circuit CC, in turn, is responsive to signals provided by a monitoring circuit M to provide a turn on signal so that switch S is on a sufficient duration that a given amount of energy is applied to the storage inductor L and then provides a turn off signal. Switch S is turned off and energy is released from the inductor until a given amount of energy has been released. These turn on -turn off conditions, however, are varied in accordance with load conditions caused either by a variation in the input voltage $V_1$ or a change in the load conditions.

As will be developed in greater detail hereinafter, if the input voltage $V_1$ decreases this will be sensed by monitor M since the energizing input current will be of smaller magnitude, resulting in a longer switch on time for switch S for transfer of a fixed amount of energy. Conversely, if the input voltage $V_1$ increases in magnitude a shorter switch on time will be provided for the same amount of energy to be transferred from the input source $V_1$ to the storage inductor L. However, if the load current $I_{L1}$ at load $L_1$ varies it will affect the magnitude of the load $V_{L1}$ as measured across the storage capacitor $C_1$. This voltage will vary inversely with load current. The load conditions are monitored by a voltage divider 20 which is connected across loads $L_1$ and $L_2$ to provide a control signal $V_L$ which varies with the load conditions. This control signal is applied to the control circuit so as to modify the turn on – turn off operation in such a manner that as the loading increases the ratio of on time to off time of switch S increases, and as the loading decreases the ratio of on time to off time of switch S decreases. Stated otherwise, as the loading increases the control circuit CC maintains switch S on for a longer period so that more energy may be stored by inductor L to compensate for the added amount of energy that must be released to accommodate the increased loading while maintaining regulated B+ and C− output voltages.

The energy storage inductor L preferably takes the form of an inductor-transformer having tightly coupled inductor windings, including a primary winding 30 and a secondary winding 32. These windings are oppositely wound, as indicated by the polarity markings on the drawings. The output voltages obtained from the voltage regulator are approximately in proportion to the inductor turns ratio K, which, for a B+ regulated voltage of +5 volts and a C− regulated voltage of −12.5 volts, should be on the order of 2.5 to 1 as referenced to the primary side.

Windings 30 and 32 are both coupled to the energy in the field and consequently the energy and "effective" winding currents may be treated by lumping the loading effects together and treating the result as if inductor L were a single winding device in which the total energizing current or the total current obtained as energy is being withdrawn will be referred to as the "primary equivalent current" $I_P$. Measurement of this current as referenced to the primary side of inductor L, during both the switch on and switch off conditions, will provide an indication of the amount of energy being delivered to the inductor and the amount of energy being released therefrom. If load current is being delivered simultaneously from both windings, then changes in the primary equivalent current cannot be separately measured in either of the two windings. However, the monitoring circuit M employs two resistors 34 and 36 which are respectively connected to the primary winding 30 and the secondary winding 32 so that the contribution to the primary equivalent current may be measured by examining the voltages developed across these two resistors. The two resistors are of small value in order to minimize power losses and are selected so as to have a ratio K in accordance with the inductor turns ratio. For example, resistor 34 may be on the order of 0.400 ohms and resistor 36 may be on the order of 0.16 ohms. Consequently, the voltage developed across resistor 36 is in the same proportion to the secondary contribution to the primary equivalent current $I_P$ as the voltage across resistor 34 is in proportion to the actual primary current.

Resistors 34 and 36 are connected so that the currents flow in opposite directions through the windings and, consequently, the differential voltage from resistor 34 to resistor 36 s proportional to the total primary equivalent current $I_P$. For example, if there is no load presented to the B+ output terminal, then once capacitor $C_1$ is charged there will be no current flow in the secondary circuit when switch S is off. Any current flow will be in the primary circuit and, hence, the voltage developed across resistor 34 is proportional to the primary current. Since there is no current flow through resistor 36 the differential voltage between resistors 34 and 36 represents the primary current.

If, however, the loading is reversed so that the secondary circuit is loaded and the primary circuit is unloaded, the primary current will be zero during the switch off time. At the instant when the switch S is turned off, the primary current can drop to zero only as the current in the secondary circuit begins to flow into the load circuit. This current will be K times the current which was flowing in the primary due to the transformer action of inductor L. Since resistor 36 is K times smaller than resistor 34, the resulting voltage across resistor 36 will be the same as the voltage just previously realized across resistor 34, but of opposite sign. The differential voltage, however, will still be proportional to the primary equivalent current $I_P$.

If both the primary and secondary circuits are loaded then some of the peak switch off primary current will flow into the primary load causing a voltage to be developed across resistor 34, and some current will flow into the secondary load developing a voltage across resistor 36. The difference of these two voltages will be the same as the voltage which would have been developed across resistor 34 alone had there been no secondary current. Consequently, resistors 34 and 36 in the monitoring circuit M provide a means of sensing the increases and decreases in the primary equivalent current and, hence, of the amount of energy being added to and released from inductor L.

The changes in the differential voltage between resistors 34 and 36 are supplied to control circuit CC by means of capacitors 40 and 42. The function performed by the control switch circuit is essentially that of a comparator and consequently it is illustrated in FIG. 1 as including a conventional dual input operational amplifier 43 having an inverting input (−) and a noninverting input (+) and an output circuit. As is conventional, when a potential applied to the noninverting input is more positive than that applied to the inverting input a positive output signal is obtained from the amplifier. Consequently, positive differential voltages obtained from the monitoring circuit M tend to cause a positive output to be obtained from the switch control circuit, whereas negative differential voltages tend to cause a negative signal. The positive signals obtained from the control circuit CC can be considered as turn on signals as they serve to actuate the switch driver SD to turn switch S on, whereas the negative output signals obtained from the control circuit CC serve as turn off signals as they cause the switch driver SD to turn off switch S.

The amplifier comparator 43 is also responsive to a reference potential $V_R$ (−) obtained from a negative reference source 44 and applied to the noninverting (+) input, as well as to the representative load voltage $V_L$ (−). The representative load voltage $V_L$, as briefly described hereinbefore, is obtained from the load monitoring circuit 20. This load monitoring circuit takes the form of a voltage divider including resistors 46 and 48 connected together in series between the B+ output terminal and the C− output terminal, with the midpoint between the two resistors being connected to the inverting (−) input of the control circuit comparator 43. Resistors 46 and 48 are chosen such that when the B+ output voltage is at its proper level (in this case +5.0 volts) the representative load voltage $V_L$ is equal to the reference voltage $V_R$. In a preferred embodiment of the invention, the representative voltage $V_L$ will be equal to −5.0 volts as also will be the reference voltage $V_R$. Consequently, with no loading the control circuit comparator 43 will respond only to the changes in the primary equivalent current $I_P$ as presented by the changes in the differential voltage obtained from resistors 34 and 36.

The frequency of operating switch S under no load conditions will be dependent upon the amount by which the energy into the inductor must be increased and by the amount of energy to be released for the output of the control circuit comparator 43 to change from a positive turn on signal to a negative turn off signal and vice versa. Although various reference levels or threshold values could be chosen, it is preferred that the level be constant. This is obtained with a hysteresis voltage $V_H$ which is developed across resistor 50 connected in series between resistor 36 and capacitor 42 to the noninverting input (+) of the control circuit comparator 43. This hysteresis voltage is, in effect, added to the voltage developed across resistor 36 and capacitively coupled through capacitor 42 to the noninverting input of the control circuit comparator. The hysteresis voltage is obtained since the voltage swings which take place across the primary winding 30 of inductor L are coupled to a resistor 52 through a capacitor 54 and a diode 56. Consequently, the voltage swing at resistor 52 results in a small signal being developed across the hysteresis resistor 50. When switch S is turned off, the primary voltage swings negative resulting in a small negative voltage being coupled to the noninverting (+) input of the control circuit comparator. This hysteresis voltage $V_H$ reinforces the off drive to switch S by way of the comparator and, hence, the differential input voltage as applied to the input terminals of the comparator must now change by an amount slightly greater than the hysteresis voltage in order to obtain a positive turn on signal. The change in this differential input voltage is obtained as the magnitude of the primary equivalent current $I_P$ decreases when the switches are off. Thus, as the primary equivalent current decreases, the differential voltage will become more positive and when the primary equivalent current has dropped by an amount proportional to the hysteresis voltage the differential voltage, as seen by the inputs to the comparator, will be positive causing the comparator to provide a positive output or turn on signal. This is relayed by the switch driver circuit SD to turn switch S on. This will drive the primary winding 30 of inductor L positive and, hence, diode 56 will be back biased and prevent the drive to resistor 52, whereupon the hysteresis voltage will disappear. As this happens, the noninverting input of comparator 43 is driven positive and reinforces the turn on signal to maintain switch S on.

As the primary equivalent current $I_P$ increases, the voltage developed across resistor 34 in the monitoring circuit M swings more positive while that across resistor 36 remains at approximately zero potential. When the voltage across resistor 34 has driven the inverting input of the comparator positive through the coupling capacitor 40 by an amount equal to the hysteresis voltage, the differential voltage as supplied to the switch control inputs will become negative. Consequently, the comparator 43 will provide a negative or turn off signal which is relayed by the switch driver circuit SD to turn switch S off and the hysteresis voltage $V_H$ will be reapplied to the noninverting input to reinforce this condition.

In the absence of loading, the comparator 43 will turn switch S on for a period sufficient that the primary current increases by an amount proportional to the hysteresis voltage $V_H$ and then switch S is driven off. The primary equivalent current will then drop by an amount equal to the hysteresis voltage. Consequently, the monitoring circuit M provides a means of measuring the energy added to and released from the inductor L by its ability to monitor the primary equivalent current.

A change in the loading or in the input voltage $V_1$ may cause the output positive voltage to decrease. In such case, the voltage signal $V_L$ applied to the inverting input (−) of comparator 43 will become more negative. This will tend to increase the duration of the switch on time and to decrease the off time by effectively increasing the positive input differential. Consequently, the increases in the primary current will exceed the decreases with the net effect being an increase in the average current transferred through the system and, hence, restore the positive output voltage. Conversely, an increase in the positive output voltage will result in a positive increase of potential $V_L$ applied to the inverting input of comparator 60. This will shift the duty cycle toward a shorter on to off ratio and decrease the average current transferred through the system and reduce the output voltage.

The hysteresis voltage $V_H$ is not affected by variations in the input voltage applied to the primary winding 30 due to the presence of diode 56. More specifically, as the primary voltage swings negative, then as it goes through a zero voltage level diode 56 is forward biased to provide a potential difference across resistor 52. The voltage applied to resistor 52 is equal to the voltage through which the primary swings once diode 56 is biased into conduction. This voltage swing is proportional to the negative output voltage obtained from the C— terminal. As will be developed in greater detail hereinafter, the negative output voltage is regulated through an error amplifier and the hysteresis voltage $V_H$ is approximately constant. Capacitor 54 serves to bypass diode 56 during the rise and fall of the primary voltage and this regeneration speeds the rise and fall of the switch driver. The pulse obtained, however, decays rapidly and does not interfere with the hysteresis level.

Referring now to FIG. 2, there is provided an error amplifier 60 used in conjunction with regulating the C— output voltage. The negative output voltage is controlled by the inductor turns ratio and the regulation of the B+ output. Additional regulation is obtained with the error amplifier 60 which employs an operational amplifier 62 having its noninverting input connected to the output of the negative reference source 44 through a resistor 64 and its inverting input connected to ground potential through a resistor 66. The output of amplifier 62 is fed back to its inverting input through a resistor 68 so as to maintain regulation of the C— output voltage.

The switch S, as shown in FIG. 2, incorporates a pair of PNP transistors 70 and 72 connected in parallel and having their emitters and collectors respectively connected in common. A base drive resistor 74 is connected at one end to the commonly connected base electrodes of the transistors and at the other end to the commonly connected emitters. The base electrodes are then connected to the switch drive circuit SD.

The switch drive circuit SD includes a pair of Darlington connected NPN transistors 80 and 82 with the base of transistor 80 being connected to the output of comparator 43 and its emitter connected to the base of transistor 82. The collector to emitter circuit of transistor 82 is connected to the commonly connected base electrodes of transistors 70 and 72 and in series with a resistor 84 to ground. The collector of transistor 80 is referenced to the positive bias supply line which is taken from the positive side of a smoothing capacitor 86 connected across the input voltage source $V_1$. Consequently, when comparator 60 provides a positive turn on signal, transistor 80 is turned on and, in turn, drives transistor 82 into conduction so that its collector current drives the base electrodes of switch transistors 70 and 72 so that these transistors are conducting. Most of this current will pass through resistor 84 connected in the emitter circuit of transistor 82. When the current becomes sufficiently large, the resulting voltage developed across resistor 84 will be sufficient to bias NPN transistor 90 into conduction. This transistor has its collector connected to the base of transistor 80 and, hence, serves to steal a portion of the base drive for transistor 80 to prevent further increase in the current flow through transistor 82. Consequently, transistor 90 and resistor 84 serve to control the level of the collector current of transistor 82 to ensure that transistors 70 and 72 are driven into saturation, and so that the collector current does not exceed the current ratings for the integrated circuit which includes transistors 80, 82, comparator 43, and an additional transistor 92 to be described in detail below.

Transistor 92 serves as a current limit transistor for limiting the current flow through the switching transistors 70 and 72 so that the primary current will not become excessive and cause saturation of the inductor L. To achieve this, the primary current flow through winding 30 and resistor 34 develops a voltage which is applied through a resistor 94 to the base of the current limit transistor 92. This is an NPN transistor having its collector connected to the base of transistor 80 and its emitter connected to the junction of secondary winding 32 and monitor resistor 36. If the primary current becomes excessive, the voltage developed across resistor 34 will be sufficient to bias transistor 92 into conduction, and as this transistor conducts it will steal a portion of the drive current for transistor 80 in a sufficient amount so that transistor 82 and switching transistors 70 and 72 will be turned off due to the overload condition.

If the primary current drops slightly during this overload condition, transistor 92 may allow transistor 82 to be turned back on which would restore the overload condition. This would result in transistor 92 again operating to steal the base drive to turn transistor 82 off. Consequently, an oscillatory condition would result during this overload condition with variations in primary current. Such an oscillatory condition could conceivably destroy the switching transistors 70 and 72. This situation is prevented through the provision of resistor 96 connected from the secondary winding 32 to the junction of resistor 94 and the base of transistor 92. In operation, as the switching transistors 70 and 72 are turned off, the primary voltage swings negative and the secondary voltage swings positive. This voltage reinforces the drive to transistor 92 through resistor 96 to reduce the switch drive current through transistor 82. Consequently, a positive bias is provided which must be overcome by the reduction of voltage across resistor 34 before transistor 92 can be turned off. Once transistor 92 is turned off by the bias provided by resistor 96, the switching transistors 70 and 72 will conduct. As these transistors conduct, the primary winding of inductor L will be driven positive and its secondary winding will be driven negative. The resulting voltage developed across resistor 94 by way of resistor 96 reinforces the turn off condition of transistor 92. The switching transistors 70 and 72 will remain on until the voltage developed across resistor 34 overcomes the bias, and in this way the switches are cylically operated between the two controlled current levels.

This cycling takes place whenever the comparator 43 drives the switching transistors 70 and 72 on for a prolonged period, sufficient to permit the primary current to reach a predetermined limiting level to cause transistor 92 to conduct. During the turn on process of the switching transistors the current limiting cycle is important. Thus, as power is first applied the output voltage taken from the regulator is essentially zero and the comparator is unbalanced. The unbalance will cause the switching transistors to be turned on and so long as they are not turned off the output voltage will remain at zero. With this unbalance, there will be insufficient differential voltage between resistors 34 and 36 to cause the switching comparator to provide a turn off signal until excessive current levels are reached. Current limiting cycling operation prevents such excessive currents being reached, and causes the output voltage to rise until it approaches the regulated voltage. With the overload condition absent, the comparator input will balance and the circuit operation will operate in the voltage regulated mode described previously.

The negative reference voltage source 44, as best shown in FIG. 2, employs an integrated circuit including an operational amplifier 100 having a Zener diode 102 connected between its inverting input and the output circuit. A constant current source 103 provides input current and this source is referenced to the negative output terminal C–. The reference source is operated between the positive input and the negative output of the regulator, and during starting conditions diode 104 prevents the negative output from being driven positive. The circuit permits the regulator to start in the current limited mode with a low input voltage and as the output voltage rises there will be sufficient operating voltage for the reference source 44 to operate as a voltage regulator.

During start up conditions, capacitors 40 and 42 provide a gradual turn on operation to minimize output overshoot conditions. Thus, capacitor 40 is chosen so as to be of greater value than that of capacitor 42. For example, capacitor 40 may be on the order of 2.2 microfarads with capacitor 42 being on the order of 1.2 microfarads. This unbalance converts the buildup of negative voltage during turn on conditions into a differential voltage applied to the comparator inputs. As the negative voltage increases this offset will drive the inverting input positive with respect to the noninverting input. This will tend to reduce the positive regulated output and since the offset is capacitively coupled the result is a gradual rise in output voltage.

From the foregoing description of the circuitry shown in FIGS. 1 and 2 it is apparent that the invention provides an energy storage inductor to which energizing current is supplied when the switching transistor is turned on and from which energy is released when the switching transistor is turned off. At least one load circuit is connected to the inductor with the load circuit including a series connected arrangement of a diode and a capacitor so that inductive current flows to charge the capacitor only when energy is released from the inductor. An energy monitoring circuit M serves to monitor the increase in primary equivalent current and to monitor the decrease in the primary equivalent current. During normal operating conditions the primary equivalent current is permitted to alternately increase and decrease by a given amount related to the hysteresis voltage $V_H$. A switch control comparator 43 responds to the changes in the differential voltage obtained from the monitoring circuit to control the turn on and turn off time durations of the switching transistors at a frequency inversely proportional to the hysteresis voltage. However, as loading conditions prevail, the differential voltage applied to the inverting and noninverting inputs of the switch control comparator will be varied so as to vary the ratio of switch on to switch off time sufficient to provide the correct increase or decrease in energy periodically being added to the inductor so as to maintain the output voltage at its regulated value. In the specific embodiment disclosed herein, two loading circuits are provided to obtain both B+ and C– voltages. If desired, the invention may be practiced by eliminating a selected one of these load circuits. These and other modifications may be made without departing from the spirit and scope of the invention as defined in the appended claims.

What is claimed is:

1. An electrical circuit comprising:
   energy storage inductor means;
   energy supply circuit means including on-off switching means for, when on, supplying energizing current from a D.C. voltage source to cause energy to be stored in said storage means;
   a load circuit inductively coupled to said storage means and including diode means and capacitive means connected in series and arranged in such a manner that inductive current flows to charge said capacitive means as energy is released from said storage means only when said switching means is off; and
   switch control means for controlling the ratio of switch on time to switch off time and comprising monitoring means including means connected in series with said storage means for sensing the magnitude of the energizing current during the switch on time and the magnitude of current relased from said storage means during the switch off time, and control circuit means connected to said monitoring means for controlling the ratio of switch on time to switch off time in dependence upon the increase in the magnitude of the sensed energizing current and the decrease in the magnitude of the sensed released current.

2. An electrical circuit as set forth in claim 1, including means directly responsive to the load voltage across said capacitive means for varying the ratio of the said switch on time to the said switch off time so a to vary the net change in energy being stored and released in accordance with the variations in the voltage across said capacitive means.

3. An electrical circuit as set forth in claim 1, including coupling means connected to said control circuit means for applying thereto a first signal which varies with changes in the amount of sensed energizing current and a second signal which varies with changes in the amount of sensed released current, said control circuit means including comparing means for providing a turn on signal or a turn off signal in dependence upon said first and second signals.

4. An electrical circuit as set forth in claim 3, including switch driver means for respectively controlling the on and off switch time durations in response to said turn on and turn off signals.

5. An electrical circuit as set forth in claim 1, wherein said switch control means includes comparator means having first and second inputs for providing a switch turn on signal when the potentials at said inputs have a first relationship and a switch turn off signal when said potentials have a second relationship, and coupling circuit means connecting said monitoring means with at least one of said inputs for varying said relationship as said supplied energizing current and said released inductive current change in magnitude.

6. An electrical circuit comprising:
   energy storage inductor means;
   energy supply circuit means including on-off switching means for, when on, supplying energizing current from a D.C. voltage source to cause energy to be stored in said storage means;
   a load circuit inductively coupled to said storage means and including diode means and capacitive means connected in series and arranged in such a manner that inductive current flows to charge said capacitive means as energy is released from said storage means only when said switching means is off; and switch control means for controlling the ratio of switch on time to switch off time and comprising monitoring means for sensing the magnitude of the energizing current during the switch on time and the magnitude of current released from said storage means during the switch off time, control circuit means connected to said monitoring means for controlling the ratio of switch on time to switch off time in dependence upon the increase in the magnitude of the sensed release current, said switch control means includes comparator means having first and second inputs for providing a switch turn on signal when the potentials at said inputs have a first relationship and a switch turn off signal when said potentials have a second relationship and coupling circuit means connecting said monitoring means with at least one of said inputs for varying said relationship as said supplied energizing current and said released inductive current change in magnitude, said connecting means includes capacitive means for applying to said at least one input a potential representative of the change in amplitude of a said current.

7. An electrical circuit comprising:
energy storage inductor means;
energy supply circuit means including on-off switching means for, when on, supplying energizing current from a D.C. voltage source to cause energy to be stored in said storage means;
a load circuit inductively coupled to said storage means and including diode means and capacitive means connected in series and arranged in such a manner that inductive current flows to charge said capacitive means as energy is released from said storage means only when said switching means is off;
switch control means for controlling the ratio of switch on time to switch off time and comprising monitoring means for sensing the magnitude of the energizing current during the switch on time and the magnitude of current released from said storage means during the switch off time, control circuit means connected to said monitoring measn for controlling the ratio of switch on time to switch off time in dependence upon the increase in the magnitude of the sensed energizing current and the decrease in the magnitude of the sensed released current, said switch control means includes comparator means having first and second inputs for providing a switch turn on signal when the potentials at said inputs have a first relationship and a switch turn off signal when said potentials have a second relationship and coupling circuit means connecting said monitoring means with at least one of said inputs for varying said relationship as said supplied energizing current and said released inductive current change in magnitude, means for applying a potential to one of said comparator inputs in dependence upon the load voltage across said load circuit capacitive means to vary said potential relationship at said comparator inputs so as to vary the ratio of switch on time to switch off time in dependence upon said load voltage.

8. An electrical circuit as set forth in claim 7, wherein said inductor means includes at least one winding connected in series with said switching means to receive said energizing current from said source when said switching means is on and said monitoring means includes an impedance connected in series with said winding so that a voltage is developed thereacross in proportion to the magnitude of the current flowing through said winding.

9. An electrical circuit as set forth in claim 8, wherein said inductor means includes a second winding connected across said load circuit so that current flows through said second winding only when said switch means is off, and said monitoring means includes a second impedance connected in series with said second winding across said load circuit so that a voltage is developed across said second impedance proportional to the magnitude of current flowing through said second winding.

10. An electrical circuit as set forth in claim 9, wherein said coupling means includes a first capacitive means for applying voltage changes across said first impedance to one of said comparator inputs and a second capacitive means for applying voltage changes across said second impedance to the second of said comparator inputs.

11. An electrical circuit as set forth in claim 10, wherein said first capacitive means is of greater capacitance than said second capacitive means to provide an initial potential unbalance at said comparator inputs as the voltage source is initially applied so that the regulated output voltage across said capacitive means gradually rises in magnitude.

12. An electrical circuit as set forth in claim 10, wherein said on-off switching means includes a transistor switching means having its emitter-collector path connected in series with said one winding to provide said energizing current thereto when said switching means is on, switch driver means responsive to each said turn on signal for providing base drive current for driving said transistor switching means on so that the magnitude of said energizing current increases with increases in said drive current, and means for limiting the magnitude of said energizing current.

13. An electrical circuit as set forth in claim 12, wherein said current limiting means includes circuit means for varying said drive current in response to the magnitude of said energizing current in such a manner that when said energizing current exceeds a predetermined level said drive current is decreased to decrease the magnitude of said energizing current.

14. An electrical circuit as set forth in claim 13, including current limiting transistor means responsive to a predetermined value of the voltage developed across said impedance in series with said one winding as energizing current flows therethrough to provide a low impedance path for a said turn on signal to thereby tend to prevent said driver means from responding to said signal and, hence, cause said drive current to decrease.

15. An electrical circuit comprising:
energy storage inductor means;
energy supplying circuit means including on-off switching means for, when on, supplying energizing current from a D.C. voltage source to cause energy to be stored in said storage means;
a load circuit inductively coupled to said storage means and including diode means and capacitive means connected in series and arranged in such a manner that inductive current flows to charge said capacitive means as energy is released from said storage means only when said switching means is off; and switch control means for controlling the on and off conditions of said switching means and comprising means connected in series circuit with said storage means for providing a first manifestation which varies in dependence upon the amount of increase in the supplied energizing current when said switching means is on and a second manifestation which varies in dependence upon the amount of decrease in the released inductive current when said switching means is off and control circuit means for controlling the on and off times of said switching means in respective dependence upon said first and second manifestations.

16. An electrical circuit as set forth in claim 15, including means directly responsive to the load voltage across said capacitive means for varying the ratio of the said switch on time to the said switch off time so as to vary the net change in energy being stored and released in accordance with the variations in the voltage across said capacitive means.

17. An electrical circuit comprising:
energy storage inductor means;
energy supplying circuit means including on-off switching means for, when on, supplying energizing current from a D.C. voltage source to cause energy to be stored in said storage means;
a load circuit inductively coupled to said storage means and including diode means and capacitive means connected in series and arranged in such a manner that inductive current flows to charge said capacitive means as energy is released from said storage means only when said switching means is off; and
switch control means for controlling the ratio of switch on time to switch off time and comprising monitoring means including means in series with said storage means for sensing the magnitude of the energizing current during the switch on time and the magnitude of the current released from said storage means during the switch off time, and control circuit means connected to said monitoring means for controlling said switching means so as to be normally on for a time duration sufficient that said energizing current increases by a given amount and is normally off for a time duration sufficient that a said given amount of energy is released.

18. An electrical circuit comprising:
an energy storage inductor-transformer having a primary winding and a secondary winding;
switching means having on and off conditions for applying energizing current to said primary winding from a D.C. voltage source when said switching means is on;
first flyback circuit means in parallel with said primary winding including a first diode and a first capacitor connected in series so that primary current flows therethrough due to energy released by said transformer to charge said first capacitor only when said switching means is off,
second flyback circuit means connected in parallel with said secondary winding and including a second capacitor and a second diode connected in series therewith, and arranged so that secondary current flows therethrough to charge said second capacitor due to the energy released by said transformer when said switching means is off;
switch control means for controlling the ratio of switch on time to switch off time and including:
means for developing first and second voltages respectively proportional to the total energizing current when said switching means is on and to the total released current when said switching means is off; and,
means for controlling said on and off conditions in dependence upon said first and second voltages.

19. An electrical circuit comprising:
energy storage inductor means;
energy supplying circuit means including switching means for, when closed, supplying energizing current from D.C. voltage source to cause energy to be stored in said storage means;
a load circuit inductively coupled to said storage means and including diode means and capacitive means connected in series and arranged in such a manner that inductive current flows to charge said capacitor as energy is released from said storage means only when said switching means is open;
switch driver means for respectively closing and opening said switching means in response to turn on and turn off signals;
comparing means having a first input and a second input and an output providing a said turn on signal when the potential at said second input is greater than that at said first input and a said turn off signal when the potential at said second input is less than that at said first input;
means for applying a first potential proportional to the voltage level across said capacitor to said first input;
means for applying a reference potential to said second input, with said reference potential being substantially equal to said first potential when the voltage level across said capacitor is at a desired level; and,
means for varying the potential difference between said inputs as energy is being stored and released from said storage means in such a manner that while energy is being stored said potential difference varies in one direction to cause the potential at said second input to be less than that at said first input whereupon a said turn off signal is provided and while energy is being released said potential difference varies in an opposite direction to cause the potential at said second input to be greater than that at said first input whereupon a said turn on signal is provided.

20. An electrical circuit as set forth in claim 19, wherein said varying means includes means for monitoring the energy being stored in said storage means and released therefrom and circuit means connected to at least one of said inputs for varying the potential difference therewith.

21. An electrical circuit as set forth in claim 20, wherein said monitoring means includes circuit means for developing a differential voltage which varies in one direction as energy is being stored and in the opposite direction as energy is released and said connecting circuit means includes means for changing the potentials at said input terminals in accordance with the changes in said differential voltage.

22. An electrical circuit as set forth in claim 21, including means for applying a relatively constant hysteresis voltage to one of said inputs so that said differential voltage must exceed said hysteresis voltage to obtain a said turn on signal or a said turn off signal.

23. An electrical circuit as set forth in claim 19, wherein said energy storage means includes at least one winding connected in series with said switching means to receive energizing current from said voltage source when said switch is closed and said potential difference varying means includes an impedance connected in series with said winding and said switching means across said source so as to develop a voltage thereacross in proportion to the magnitude of current flowing through said winding.

24. A switching regulator as set forth in claim 23, wherein said load circuit is connected in parallel with said series connected winding and impedance in such a manner that current flows through said diode means to charge said capacitive means only when said switch is open so that energy is released from said storage means.

25. A switching regulator as set forth in claim 24, wherein said potential varying means includes circuit means for applying to one of said inputs of said comparing means a potential representative of the direction and amount of change in the voltage developed across said impedance as energy is stored in and released from said energy storage means.

26. A switching regulator as set forth in claim 19, wherein said energy storage means includes an energy storage inductor-transformer having a primary winding and a secondary winding, said primary winding being connected in series with said switching means to receive energizing current from said voltage source when said switch is closed so as to increase the stored energy, a first impedance connected in series with said primary winding and said switching means across said voltage source, said load circuit being connected across said secondary winding with said diode means being arranged so that inductive current flows therethrough to charge said capacitive means from energy released by said storage means only when said switching means is open, said potential varying means including first and second impedance means respectively connected in series with said primary winding and said secondary winding for developing first and second voltages thereacross as current flows through said respective windings, and circuit means for applying the changes in the differential voltage across said impedances to said first and second inputs of said comparing means.

27. A switching regulator as set forth in claim 26, including a second load circuit including a second capacitive means and a second diode means connected across said series connected primary winding and said first impedance with said diode means being arranged to conduct current therethrough to charge said second capacitive means from energy released from said storage means only when said switching means is open.

28. An electrical circuit comprising:
energy storage inductor means;
switching transistor means having its emitter-collector path connected in series with said inductor means to supply thereto output energizing current from a D.C. voltage source;
means for providing switch turn on and turn off signals;
switch driver means responsive to a said turn on signal for providing base drive current for driving said switching means on so that the magnitude of said output current increases with increases in said drive current;
means for limiting the magnitude of said output current and including circuit means for varying said drive current in response to the magnitude of said output current in such a manner that when said output current exceeds a given level said drive current is decreased to decrease the magnitude of said output current, said circuit means includes impedance means connected in series with said inductor means for providing a control voltage which varies in magnitude proportional to said output current and current limiting transistor means responsive to a predetermined value of said control voltage for providing a low impedance path to said turn on signal to thereby tend to prevent said driver means from responding thereto to provide said drive current.

29. An electrical circuit as set forth in claim 28, including biasing means for applying a biasing potential to said current limiting transistor means such that said control voltage must decrease by an amount greater than said biasing potential before said low impedance path is removed so that said drive means will then respond to a said turn on signal to provide said base drive current for said switching transistor means.

* * * * *